Nov. 21, 1961     C. H. BASSETT     3,009,869
FUEL ELEMENT FOR NUCLEAR REACTORS
Filed Jan. 19, 1959
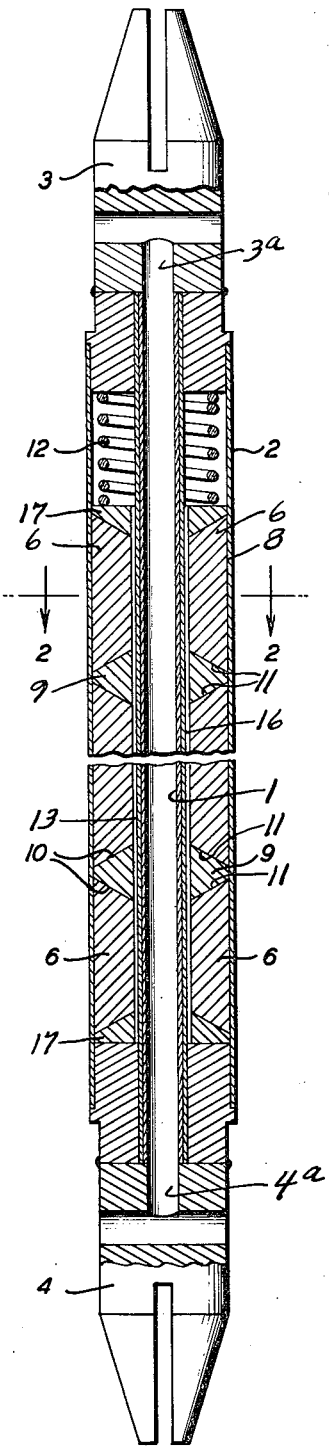
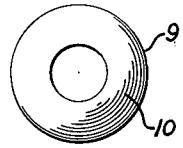
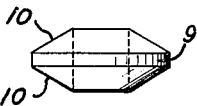
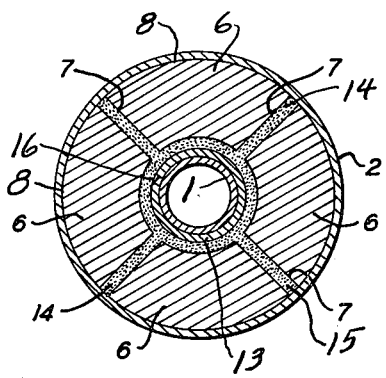
INVENTOR.
CHARLES H. BASSETT
BY
ATTORNEY United States Patent Office 3,009,869
Patented Nov. 21, 1961

3,009,869
FUEL ELEMENT FOR NUCLEAR REACTORS
Charles H. Bassett, Riverdale, Md., assignor, by mesne assignments, to the United States of America as represented by the United States Atomic Energy Commission
Filed Jan. 19, 1959, Ser. No. 787,590
18 Claims. (Cl. 204—193.2)

This invention relates to fuel elements for nuclear reactors and, more particularly, to a fuel element particularly adapted for use in reactors of high power density used to generate steam for the production of electricity.

The present trend of thermal-reactor research is toward ceramic compounds, since an apparent limit on reactor operating temperatures and fuel burnup is imposed by swelling of metallic fuels at operating temperatures above 400° C. This swelling of metallic fuel is due in part to fission-product gases. When four atoms of U-235 are fissioned, one of the eight fission-product atoms formed is either xenon or krypton which are practically insoluble in uranium and are under very high pressure within the solid fuel lattice structure. As the maximum achievable burnup of metallic fuel is inversely related to the temperature of the fuel during irradiation, the theory is that metallic uranium becomes weaker at high temperatures, thereby permitting the expansion of internal fission-product gases to increase the size of the fuel elements by swelling to unacceptable limits.

One of the methods for overcoming the swelling problem is to use high density ceramic materials, such as uranium oxide ($UO_2$) enriched with U-235, in the form of sintered cylindrical pellets which have a high melting point (2760° C.), good mechanical strength, good resistance to radiation damage, and high burnups. Burnups greater than 25,000 Mwd./ton appear feasible without appreciable damage to the $UO_2$ and the structural confining material. The release of fission-product gases xenon and krypton from the irradiated $UO_2$ is diffusion controlled and hence high density $UO_2$ without interconnecting pores releases only very small amounts of the gases.

To prevent the escape of fission-product gases, sintered cylindrical ceramic fuel pellets have heretofore been housed within a metallic tube of compatible material, such as austenitic stainless steel or zirconium. Due to the relatively low neutron absorption of zirconium, it is preferred as a tubing material to effect savings through the use of uranium of lower enrichment, and through the reduction in the critical mass of uranium.

The thermal coefficient of expansion of stainless steel is greater than that of $UO_2$, whereas zirconium expansion is less than $UO_2$. This factor is of importance in fuel element design. Where a gap exists between the fuel and the tubing, the fuel pellet must operate at high temperatures in order to transfer heat across the gap. Heretofore, it has been the practice to grind cylindrical fuel pellets to close tolerances for snug engagement within close tolerance tubing, and such precision fabrication is very costly. To avoid finishing cylindrical pellets and tubing to exact size, fuel pellets have been thermally bonded to the tubing by a lead filler, as disclosed in Patent 2,838,452, issued June 10, 1958, to John M. West et al. Such a lead filler results in an increase in the loss of neutrons by parasitic capture, has a low coefficient of heat conductivity and is fluid at relatively low operating temperatures.

An object of the invention is to provide a fuel element for releasing energy by a nuclear chain reaction while regenerating fertile fuel material therein, such as uranium-238 or thorium-232.

Another object of the invention resides in the provision of a fuel element structure wherein fissionable ceramic fuel pellets in the form of segments of a cylinder are pressed radially by a spring and wedge rings into tight contact engagement against the inner surface of an outer tube to eliminate any gap there between, the segments defining a central opening and radial passages leading therefrom to the tube for the transfer of heat to the latter and also to provide space to receive fission-product gases. Higher burnup of the fissionable material is thus achieved by providing additional space to receive the fission-product gases.

Another object of the present invention resides in the provision of a nuclear reactor fuel element comprising a plurality of enriched ceramic fuel pellet segments spaced apart and biased radially against the inner surface of an outer tube by means of a compression spring and wedge rings having frusto-conical surfaces.

Another object of the invention resides in the provision of a fuel element wherein the fuel pellet segments are formed of sintered uranium oxide ($UO_2$) enriched with uranium-235 and spaced apart by means of wedge rings formed of uranium-238 or thorium-232 which, during operation of the reactor, absorb slow neutrons to produce plutonium-239 or uranium-233, respectively.

Another object of the invention resides in the provision of a fuel element comprising concentric inner and outer tubes defining an annular chamber to receive the fuel pellet segments and wedge rings, the inner tube providing a passageway for fluids to be heated.

Another object of the invention resides in the provision of a fuel element embodying a burnable poison, such as boron, said poison being disposed between the fuel segments and the inner tube.

Another object of the invention resides in the provision of a fuel element wherein a metallic tube containing the burnable poison encloses the inner tube.

The invention embodies other novel features, details of construction and arrangement of parts which are hereinafter set forth in the specification and claims and illustrated in the accompanying drawings forming part thereof, wherein:

FIG. 1 is a longitudinal section illustrating a fuel element embodying features of the invention.

FIG. 2 is an enlarged transverse section taken along the line 2—2 of FIG. 1.

FIG. 3 is a plan view of the wedge disc.

FIG. 4 is a side elevation of the disc.

Referring now to the drawings for a better understanding of the invention, the fuel element is shown as comprising concentric tubes 1 and 2 of stainless steel or zirconium having plugs 3 and 4 of stainless steel, or other suitable material, secured to opposite ends thereof to form a leakproof housing to enclose a plurality of sets of fissionable fuel pellets 6 formed of sintered uranium oxide ($UO_2$) enriched with uranium-235. The plugs are formed with passages 3a and 4a for the flow of fluid through the inner tube 1. As illustrated in the drawings, the fuel pellets 6 are in the form of segments of a cylinder, each having radial surfaces 7—7 merging with an arcuate surface 8 complementary to the inner surface of the tube 2.

Wedge rings 9 of enriched uranium oxide ($UO_2$) are interposed between adjacent sets of fuel pellets 6 and formed with frusto-conical wedge surfaces 10 for engagement by complementary end surfaces 11 formed on the fuel pellets. A helical stainless steel compression spring 12, interposed between the plug 3 and the stack of pellets 6 and wedge rings 9, acts to urge the stack axially toward the plug 4. The spring 12 and wedge rings 9 coact to bias the fuel pellets 6 radially into tight engagement against the inner surface of the tube 2. The wedge rings may be formed of either uranium oxide ($UO_2$) or thorium oxide which, during operation of the reactor, absorb slow neutrons to produce plutonium-239 or uranium-233, respectively.

By forming the fuel pellets 6 and wedge rings 9 of high density, fissionable ceramic materials, such as uranium oxide ($UO_2$) suitably enriched with uranium-235, they have good mechanical strength, good resistance to radiation damage, and a high melting point of approximately 2760° C. As fuel pellets of this type may be formed without a high percentage of interconnecting pores, only small amounts of fission-product gases, xenon and krypton, are released during irradiation. The tubes 1 and 2 are preferably formed of zirconium due to its low neutron absorption properties and the resulting saving through the use of uranium of lower enrichment and the reduction in the critical mass of the uranium.

For control of excess reactivity, a tube of stainless steel 16 embodying a burnable poison, such as boron, is provided within the fuel element to enclose the inner tube 1.

During assembly of the fuel element the central opening 13 and radial passages 14 defined by the fuel pellets may be filled with a suitable gas, such as helium, or a powdered material 15, such as beryllium oxide.

In addition to its high coefficient of heat conductivity, beryllium oxide is also a good neutron moderator and thereby permits the use of uranium of lower enrichment or a reduction in the critical mass of the uranium. As the thermal coefficient of expansion of $UO_2$ pellets is greater than the expansion of zirconium tubing, it will be noted that the beryllium oxide filler 15 will be further compacted during use of the fuel rod and thereby further increase the heat conductivity of the beryllium oxide mass. Heat insulating washers 17 are provided at opposite ends of the stack of fuel pellets.

The fuel rod, thus shown and described, is adapted for use in a fuel element assembly for a nuclear power reactor, as shown and described in a copending application of James J. Dickson, filed August 26, 1958, Ser. No. 757,381, the disclosure of which is incorporated herein by reference. See also, Nucleonics, vol. 15, No. 7, July 1957, page 94, for Uranium Dioxide Properties and Characteristics.

As beryllium oxide has a much higher coefficient of heat conductivity than ceramic pellets formed of $UO_2$, it is now possible with this embodiment of the invention to conduct more heat from the fuel pellets to the tubes 1 and 2. It will also be noted that the pellets are separated by a neutron moderating material, whereby further lowering of the enrichment of the uranium or a reduction in the critical mass of uranium is possible.

The use of beryllium oxide or other similar moderating and reflecting powders has the additional advantage that it is relatively stable both in air and in water. Thus, in fuel elements of the prior art where NaK or similar heat conducting mediums were utilized, energetic chemical reactions could result if pin holes or other leaks developed in the tubing.

The useful life of fuel elements is limited by radiation damage and by a decrease in the amount of fissionable material during operation of the reactor and the simultaneous increase in the parasitic neutron capture by fission-products. As the amount of fissionable material in a reactor does not greatly exceed that required for criticality, the effective multiplication factor of the system steadily decreases as such extra quantity of fissionable material is used up until satisfactory operation is no longer possible. To increase the useful life (or burnup), the wedge rings 9 may be formed of fertile material, such as uranium-238 or thorium-232, which, as a result of neutron capture, are converted into fissionable material, plutonium-239 or uranium-233, respectively, to replace, to some extent, the fissionable material which has been consumed, and/or recovered by standard procedures.

Standard assembling procedures are employed during assembly of the fuel element. Helium or other inert gas atmosphere is present in a dry box or remote assembling installation during assembling and sealing, and ordinary welding and brazing techniques are employed in sealing the plugs 3 and 4 to the ends of the tubes 1 and 2.

Having described a preferred embodiment of the present invention, it is to be understood that although specific terms and examples are employed, they are used in a generic and descriptive sense and not for purposes of limitation; the scope of the invention being set forth in the following claims.

This application is a continuation in part of applicant's copending application filed October 3, 1958, Serial No. 765,198.

What is claimed is:

1. In a nuclear reactor fuel element, inner and outer concentric tubes defining an annular chamber and an axial passage, plug members disposed at the ends of said concentric tubes to seal said annular chamber, said plug members having passages defined therethrough in fluid communicating relation with each other through said inner tube, a plurality of sets of fissionable fuel pellet segments within said chamber, wedge members interposed between said sets of fuel pellet segments, and a resilient element coacting with said wedge members to urge said fuel pellet segments radially into contact engagement against the inner surface of said outer tube.

2. In a nuclear reactor fuel element, inner and outer concentric tubes defining an annular chamber and an axial passage, plug members disposed at the ends of said concentric tubes to seal said annular chamber, said plug members having passages defined therethrough in fluid communicating relation with each other through said inner tube, a plurality of sets of fissionable fuel pellet segments within said chamber, wedge members interposed between said sets of fuel pellet segments, and a resilient element coacting with said wedge members to urge said fuel pellet segments radially into contact engagement against the inner surface of said outer tube, said wedge members comprising a fertile material convertible into fissionable fuel material by absorbing neutrons emitted from the fissionable fuel pellet segments.

3. In a nuclear reactor fuel element, inner and outer concentric tubes defining an annular chamber and an axial passage, plug members disposed at the ends of said concentric tubes to seal said annular chamber, said plug members having passages defined therethrough in fluid communicating relation with each other through said inner tube, a plurality of sets of fissionable fuel pellet segments within said chamber, wedge members interposed between said sets of fuel pellet segments, and a resilient element coacting with said wedge members to urge said fuel pellet segments radially into contact engagement against the inner surface of said outer tube, said wedge members comprising uranium-238 to be converted into plutonium-239 by absorbing neutrons emitted from the fissionable fuel pellet segments.

4. In a nuclear reactor fuel element, inner and outer concentric tubes defining an annular chamber and an axial passage, plug members disposed at the ends of said concentric tubes to seal said annular chamber, said plug members having passages defined therethrough in fluid communicating relation with each other through said inner tube, a plurality of sets of fissionable fuel pellet segments within said chamber, wedge members interposed between said sets of fuel pellet segments, and a resilient element coacting with said wedge members to urge said fuel pellet segments radially into contact engagement against the inner surface of said outer tube, said wedge members comprising thorium-232 to be converted into uranium-233 by absorbing neutrons emitted from the fissionable fuel pellet segments.

5. In a nuclear reactor fuel element, inner and outer concentric tubes defining an annular chamber and an axial passage, plug members disposed at the ends of said concentric tubes to seal said annular chamber, said plug members having passages defined therethrough in fluid communicating relation with each other through said inner tube, a plurality of sets of fissionable fuel pellet segments within said chamber, wedge members interposed between said sets of fuel pellet segments, and a resilient element coacting with said wedge members to urge said fuel pellet segments radially into contact engagement against the inner surface of said outer tube, said fuel pellet segments comprising sintered ceramic uranium oxide.

6. In a nuclear reactor fuel element, inner and outer concentric tubes defining an annular chamber and an axial passage, plug members disposed at the ends of said concentric tubes to seal said annular chamber, said plug members having passages defined therethrough in fluid communicating relation with each other through said inner tube, a plurality of sets of fissionable fuel pellet segments within said chamber, wedge members interposed between said sets of fuel pellet segments, and a resilient element coacting with said wedge members to urge said fuel pellet segments radially into contact engagement against the inner surface of said outer tube, said fuel pellet segments comprising segments of a cylinder, and said wedge members being in the form of rings having tapered wedge surfaces engaging the ends of said segments.

7. In a nuclear reactor fuel element, inner and outer concentric tubes and plugs defining an annular chamber and an axial passage, said plugs disposed at the ends of said concentric tubes and sealed thereto providing end walls for said annular chamber, said plugs having a passage defined therethrough in fluid communicating relation with each other through said axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube.

8. In a nuclear reactor fuel element, inner and outer concentric tubes and plugs defining an annular chamber and an axial passage, fissionable ceramic fuel pellets in the form of segments of a cylinder in said chamber to define a central opening and radial passages therebetween, wedge members interposed between said fuel pellets, and resilient means co-actng with said wedge members to urge said fuel pellets radially into contact engagement against the inner surface of said outer tube, and a burnable poison tube telescopically engaged over said inner tube.

9. In a nuclear reactor fuel element, inner and outer concentric tubes and plugs defining an annular chamber and an axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, and a burnable poison tube telescopically engaged over said inner tube, said wedge members having tapered wedge surfaces engaging complementary surfaces on said fuel pellets.

10. In a nuclear reactor fuel element, inner and outer concentric tubes and plugs defining an annular chamber and an axial passage, said plugs disposed at the ends of said concentric tubes and sealed thereto providing end walls for said annular chamber, said plugs having a passage defined therethrough in fluid communicating relation with each other through said axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, said fuel pellets and wedge members being formed of high density sintered ceramic material, said wedge members comprising uranium-238 to be converted into plutonium-239 by absorbing neutrons emitted from the fissionable fuel pellets.

11. In a nuclear reactor fuel element, inner and outer concentric tubes and plugs defining an annular chamber and an axial passage, said plugs disposed at the ends of said concentric tubes and sealed thereto providing end walls for said annular chamber, said plugs having a passage defined therethrough in fluid communicating relation with each other through said axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, said fuel pellets and wedge members being formed of high density sintered ceramic material, said wedge members comprising thorium-232 to be converted into uranium-233 by absorbing neutrons emitted from the fissionable fuel pellets.

12. In a nuclear reactor fuel element, inner and outer concentric tubes and plugs defining an annular chamber and an axial passage, said plugs disposed at the ends of said concentric tubes and sealed thereto providing end walls for said annular chamber, said plugs having a passage defined therethrough in fluid communicating relation with each other through said axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, said wedge members comprising a fertile material convertible into a fissionable fuel material by absorbing neutrons emitted from the fissionable fuel pellets, said opening and radial passages containing a neutron moderating material having a high coefficient of heat conductivity.

13. In a nuclear reactor fuel element, inner and outer concentric tubes and plugs defining an annular chamber and an axial passage, said plugs disposed at the ends of said concentric tubes and sealed thereto providing end walls for said annular chamber, said plugs having a passage defined therethrough in fluid communicating relation with each other through said axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, said wedge members comprising a fertile material convertible into a fissionable fuel material by absorbing neutrons emitted from the fissionable fuel pellets, said opening and radial passages containing a neutron moderating material having a high coefficient of heat conductivity, said moderating material comprising beryllium oxide.

14. In a nuclear reactor fuel element, inner and outer concentric tubes defining an annular chamber and an axial passage, a plurality of sets of fissionable fuel pellet segments within said chamber, wedge members interposed between said sets of fuel pellet segments, and a resilient element coacting with said wedge members to urge said fuel pellet segments radially into contact engagement against the inner surface of said outer tube, and a burnable poison surrounding said inner tube.

15. In a nuclear reactor fuel element, inner and outer concentric tubes and plugs defining an annular chamber and an axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, and a metallic tube embodying a burnable poison telescopically engaged over said inner tube.

16. In a nuclear reactor fuel element, inner and outer concentric tubes and plugs defining an annular chamber and an axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, and a metallic tube embodying a burnable poison telescopically engaged over said inner tube, said burnable poison consisting of boron.

17. In a nuclear reactor fuel element, inner and outer concentric tubes and plugs defining an annular chamber and an axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, and a metallic tube embodying a burnable poison telescopically engaged over said inner tube, said burnable poison consisting of boron, and a heat transfer medium filling said central opening and radial passages.

18. In a nuclear reactor fuel element, inner and outer concentric tubes and plugs defining an annular chamber and an axial passage, fissionable ceramic fuel pellets in the form of segments of a cylinder in said chamber to define a central opening and radial passages therebetween, wedge members interposed between said fuel pellets, and resilient means co-acting with said wedge members to urge said fuel pellets radially into contact engagement against the inner surface of said outer tube, and a metallic tube embodying a burnable poison telescopically engaged over said inner tube, said burnable poison consisting of boron, and a heat transfer medium filling said central opening and radial passages, said fuel pellets and wedge members comprising high density, sintered uranium dioxide.

References Cited in the file of this patent

UNITED STATES PATENTS

| | | |
|---|---|---|
| 2,799,642 | Hurwitz et al. | July 16, 1957 |
| 2,838,452 | West et al. | June 10, 1958 |